United States Patent Office 3,131,285
Patented Apr. 28, 1964

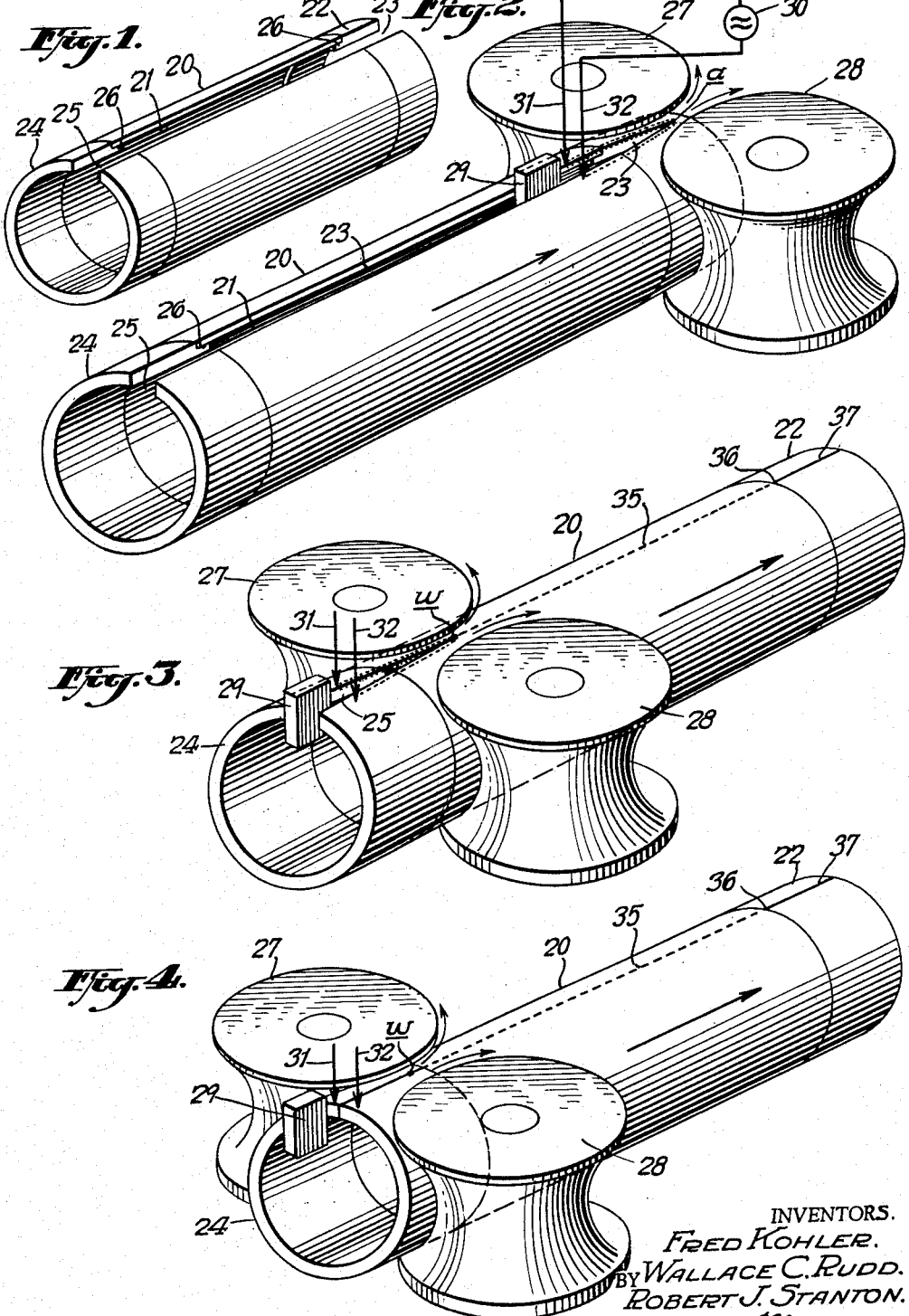

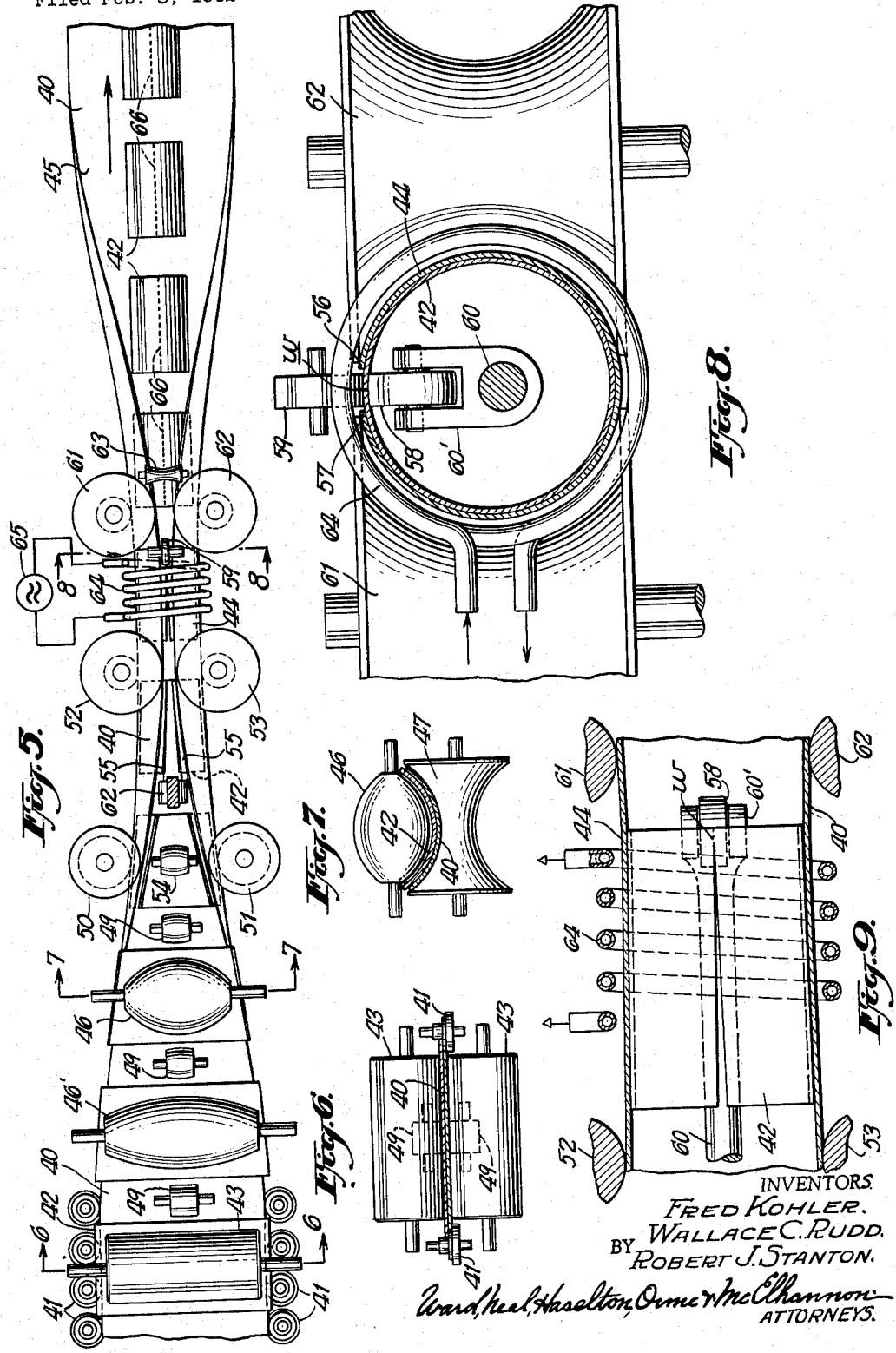

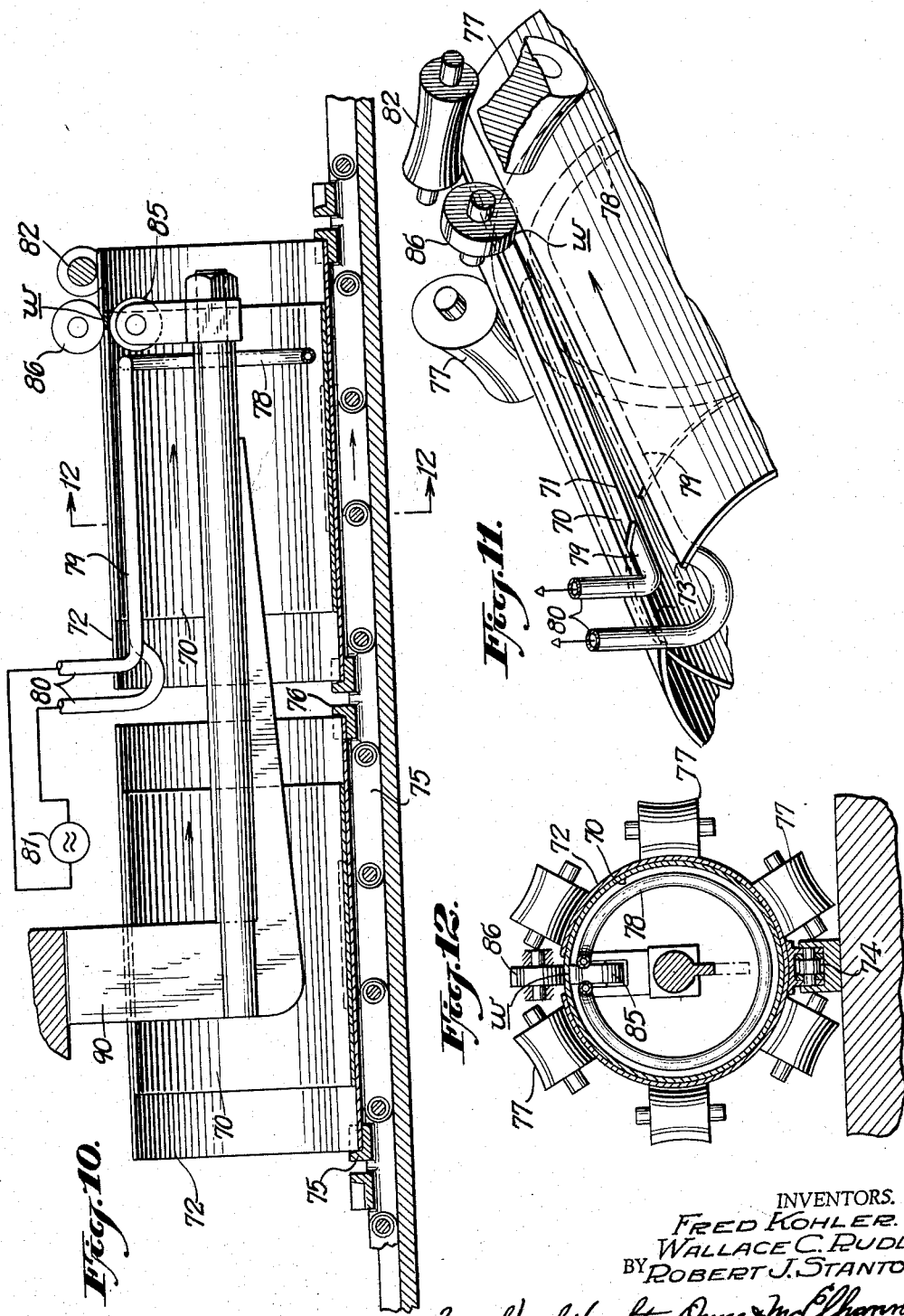

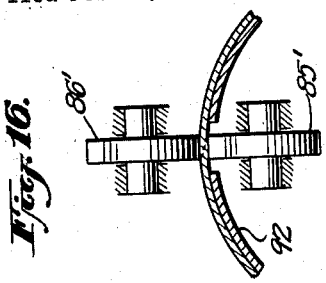
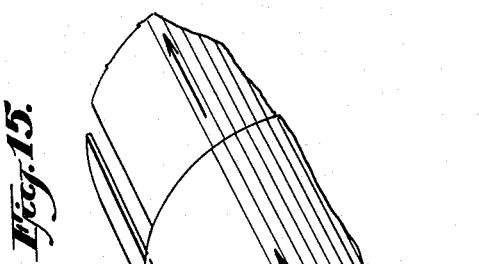
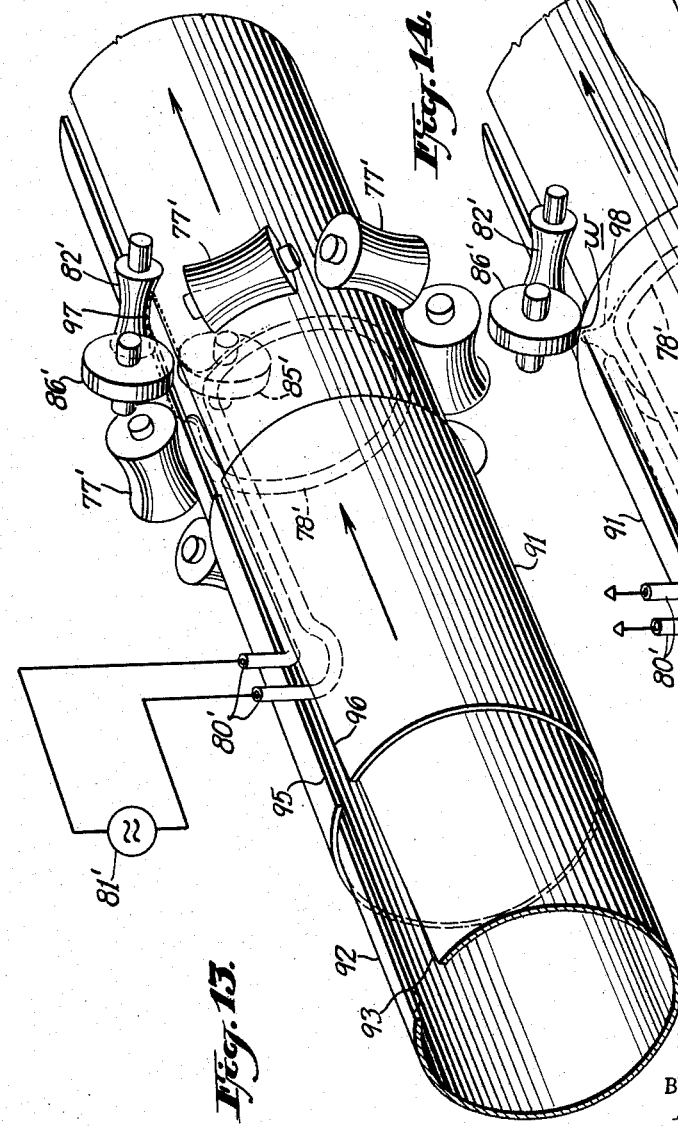

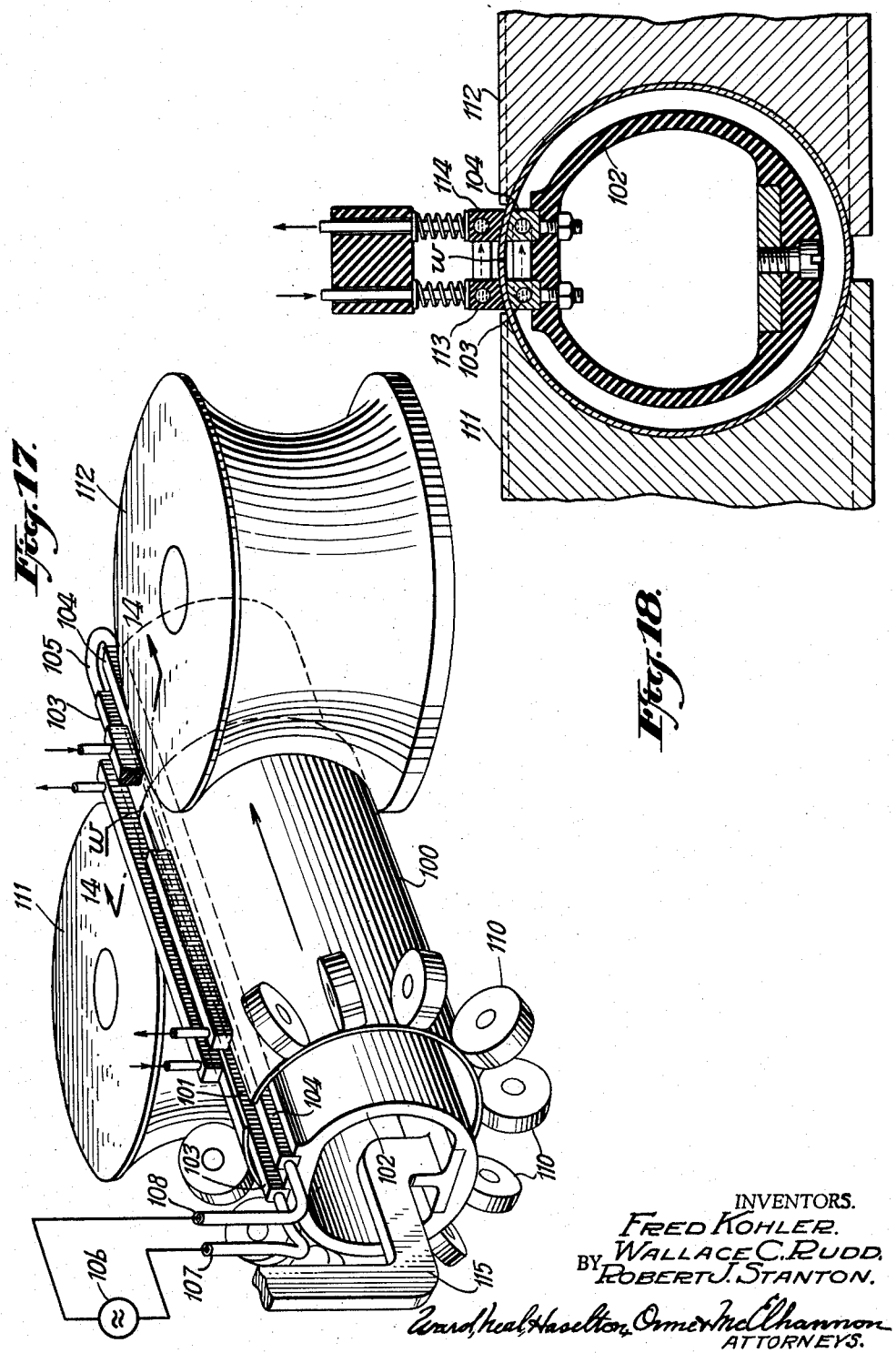

3,131,285
HIGH FREQUENCY WELDING OF METAL
ELEMENTS OF FINITE LENGTH
Fred Kohler, New York, Wallace C. Rudd, Larchmont, and Robert J. Stanton, Brooklyn, N.Y., assignors, by mesne assignments, to American Machine & Foundry Company, New York, N.Y., a corporation of New Jersey
Filed Feb. 8, 1962, Ser. No. 171,936
11 Claims. (Cl. 219—67)

This invention relates to methods and apparatus for welding together the opposed edges of pairs of metal portions or elements of finite length by the use of high frequency electrical heating current for heating such edges up to welding temperature upon their approach to a weld point at which point the metal portions are welded together under pressure to provide a longitudinally-extending seam which is welded throughout from a point substantially at the forward end thereof and substantially to the trailing end thereof. The invention is particularly adapted for forming a longitudinally-extending welded seam in short or finite-length tubular members, although the invention may also be used to weld together elements such as strip-like metal portions of finite length.

The various embodiments of the invention are adapted for use in the forming of welded seams wherein the edges to be welded are brought together either in abutting edge-to-edge relationship, or in lapped relation to form a lap welded seam which also, if desired, may be subjected to such pressure at the region of welding that the lapped marginal portions are reduced to substantially the single thickness of the metal being welded. The invention in its various forms is applicable to cases wherein the high frequency current is applied inductively either by a coil located to surround the advancing workpieces or a coil of one or more turns located internally, for example, in the case of the welding of tubular lengths. Also, the invention is applicable to cases where it may be desired to apply the high frequency current conductively by the use of contacts directly engaging the workpieces.

In accordance with certain preferred examples of the invention, the tubular elements to be welded, or a series or succession thereof, are each initially formed with a longitudinally-extending gap, the opposite edges of which are pressed or firmly held together as same pass a weld point and such opposite edges being heated by the high frequency current for a substantial distance in advance of the weld point so that the edge surfaces reach welding temperature as they are brought under pressure at the weld point. This general method of welding by the use of high frequency heating current has been used with a high degree of success for welding longitudinal seams in extensive lengths of tubing and seams between continuously-extending strips of sheet metal or structural elements. But when such methods are applied to heating of workpieces of relatively short or finite length, various problems arise which may be summarized as follows.

As the edge portions of the workpiece or pieces which are to be welded together are advanced longitudinally, if the electrical circuit is such that same is not completed until the forward ends thereof arrive at the weld point, then the edges will not start to become heated at least in the manner desired until the forward ends actually reach the weld point where same are brought together under pressure and consequently such edges will not be properly heated gradually up to welding temperature until the forward ends of the workpieces have advanced a substantial distance past the weld point, thus leaving the initial portions of the seam unwelded. Also, as the trailing ends of the workpieces approach the weld point, the circuit for the high frequency heating current will become interrupted so that portions of the trailing ends will pass the weld point while not being properly heated, thus leaving the trailing end portion of the desired seam unwelded. Furthermore, in case the edges of the workpieces are spaced apart by a gap which is maintained by spacer means or a so-called seam guide therebetween against which the edge portions are held under pressure, then as the trailing ends of the workpieces pass such seam guide, they will snap together, thus closing the gap substantially in advance of the weld point and interrupting or short-circuiting the desired path of the heating current.

In accordance with the present invention, these problems in welding finite length workpieces by the general methods above referred to, are overcome by providing arrangements for so advancing the workpieces that the high frequency heating current will begin to be applied to the opposed edges to be welded when the forward ends thereof are at an appropriate distance in advance of the weld point. Thus when such forward ends reach the weld point, the welding may substantially immediately start, and also the arrangements provide for the maintenance of the desired flow of high frequency heating current on the opposed edges until the trailing ends thereof actually reach the weld point, and in case the opposed edges are spaced apart with a gap therebetween in advance of the weld point, then the edges are kept from snapping together and closing the gap and interfering with the desired circuit path until the trailing edges actually reach the weld point. The invention in one of its important aspects makes possible the accomplishment of these results by preceding and succeeding the advancing forward ends and the trailing ends respectively of the workpieces by conductive means so constructed and arranged that they do not become welded together, but only the desired seam on the workpieces becomes welded from beginning to end, and thus the arrangements for holding the finite length workpieces and controlling the desired current paths may be repeatedly reused. Furthermore, with the present invention, it is not necessary to form the workpieces with any special configurations or shapes in order to accomplish the desired results.

Various further and more specific objects, features and advantages of the invention will appear from the description given below, taken in connection with the accompanying drawings, illustrating by way of example various preferred forms of the invention.

In the drawings:

FIGS. 1–4 inclusive somewhat schematically illustrate one embodiment of the invention in a simple form, FIG. 1 being a perspective view of a tubular workpiece of finite length equipped with, or accompanied by, certain members at the forward and trailing ends respectively for carrying out the invention, the assembly being ready to be introduced into the welding apparatus as schematically indicated in FIG. 2, where the heating of the forward ends of the edges of the workpiece has just started. FIG. 3 illustrates the positions of the parts when the workpiece has arrived to a position with its trailing end edges about to be welded. FIG. 4 illustrates the position of the parts after the seam in the workpiece has been welded to its trailing end. In these figures the high frequency is conductively applied by contacts engaging opposed edges of the gap which are being welded together, but as above indicated, the current might be inductively applied as shown in various other figures of the drawings.

FIGS. 5–9 inclusive illustrate an embodiment of the invention for welding a series of tubular workpieces in succession, while same are carried by a continuous metallic belt arranged to become shaped with a generally circular cross-section, for embracing the workpieces and forming and holding them in generally cylindrical shape while same are passed through the welding apparatus, and releasing same thereafter. In the particular embodiment as here shown, the high frequency current is applied by the use of a surrounding induction heating coil positioned just in advance of the weld point, but if desired an internal induction coil, or the conductive application of the current, might here be used. FIG. 5 is a somewhat schematic plan view of the arrangement of the apparatus. FIGS. 6, 7 and 8 respectively are transverse sectional views taken substantially along the lines 6—6, 7—7 and 8—8 of FIG. 5. FIG. 9 is a vertical sectional view taken at the welding region.

FIGS. 10-12 inclusive illustrate another embodiment of the invention wherein the tubular workpieces respectively are carried to and through the welding region by individual carrier means which embrace same respectively, the carrier means being advanced by suitable belt or flexible chain-like means. FIG. 10 is a vertical sectional view. FIG. 11 is a perspective view at the welding region. And FIG. 12 is a transverse sectional view taken substantially along line 12—12 of FIG. 10. With this embodiment of the invention, the high frequency current is for example shown as being applied by the use of an internal induction heating coil.

FIGS. 13-16 inclusive somewhat schematically illustrate a further embodiment of the invention, wherein tubular workpieces of finite length respectively are arranged to encircle tubular carrier devices as same pass through the welding region at which, in this instance, the heating is accomplished by the use of a high frequency internal induction heating coil.

FIGS. 17 and 18 respectively are perspective and transverse sectional views of still another embodiment of the invention wherein tubular workpieces of finite length are advanced along stationary supporting means as they pass the welding region, the high frequency current being conductively applied by the use of contact means extending along the edges to be heated.

Referring to the drawings in further detail, a tubular workpiece of finite length is illustrated at 20 in FIG. 1 as having a longitudinally-extending gap as at 21. The forward end of this workpiece, as shown, is equipped with a ring-like metal member 22 also having a gap as indicated at 23, and the trailing end of the member 20 is similarly equipped with a ring-like member 24 having a gap as at 25. These ring-like members may be formed with flange-like portions as at 26, protruding inwardly of the workpiece as shown and adapted to be embraced for example with a forced fit by the forward and trailing ends respectively of the workpiece. The workpiece is so made and is of such dimensions that it resiliently tends to close its gap, but the gap is held open before welding, by means of the ring members.

Such an assembly is shown somewhat enlarged in FIG. 2, and in conjunction with welding apparatus shown here somewhat schematically, the forward end of the assembly being advanced between a pair of pressure-applying rolls as at 27, 28, located at opposite sides of the position where the weld point is to occur and one or both of such rolls, if desired, being driven in directions so as to advance the workpiece assembly therebetween and at the same time progressively to close the gap which extends along the assembly, the gap being held in open condition in advance of the weld point by the use of a seam guide or spreader element of known form and preferably of insulating material, as indicated at 29. As shown, a source of high frequency current, for example of a frequency of 50,000 to 100,000 cycles or preferably much higher, such as 300,000 to 400,000 cycles, is indicated at 30, connected to contacts as at 31, 32, here schematically shown but of suitable known fluid-cooled construction and positioned to engage respectively the metal of the workpiece assembly at opposite sides of the gap. As here shown in FIG. 2, the pressure rollers have caused the gap 23 in the forward ring-like member 22 to become partially closed so that the gap therein has a V shape, with its vertex at a point indicated at $a$. Thus the high frequency current path with the parts as shown, will extend from contact 31, for example, along on one of the advancing opposed edges of the gap 23 in the workpiece, thence along the corresponding edge of the gap in the ring-like member 22, to the point $a$ and thence similarly along back to the other contact 32. Thus the forward ends of the opposed edges of the workpiece will start to become heated by the high frequency current just as soon as the very forward ends thereof reach and pass the contacts 31, 32, the circuit being completed by the edges of the gap in the ring member just as soon as same come into contact at the apex $a$ of such gap.

Assuming for example that the workpiece 20 is formed of steel or other ferrous material, then the opposed edge surface portions of the gap therein will become efficiently and promptly heated, the heat being concentrated on the very surfaces of the opposing edges by reason of the strong mutual inductance effect as the gap edges approach each other. The ring-like members 22, 24, however, may be formed of a suitable metal which will not become so rapidly and effectively heated, or so easily heated to welding temperature, at least while same are passing through the relatively short distance from the contacts to the point where same come into engagement. For example, these ring-like elements may be formed of some low resistance and good heat-conductive material, such as copper, so that the resistance heating therein will be relatively slight and the heat will dissipate itself conductively away from the gap edges so that they will not reach welding temperature at the apex $a$ of the gap. Also if desired, these ring-like elements may be formed of any suitable high temperature-resistant metal which will not become heated to welding temperature during its short time of travel past the welding region. Thus they may repeatedly be reused.

As shown in FIG. 3, the larger part of the workpiece 20, has advanced past the weld point $w$ and the welded seam, as indicated at 35, has been formed thereon, such seam extending from the very forward end 36 of the workpiece continuously back to the weld point $w$. On the other hand, the seam as at 37 in the ring-like member 22 will be closed, but not welded. As further indicated in FIG. 3, it will be noted that the current path from the contacts 31, 32 extends respectively from opposite edges of the gap 25 in the ring-like member 24 to and from the weld point $w$ along the edges of the gap at the trailing end of the workpiece, the gap in the workpiece here being of V-shape and rapidly coming to closed condition, yet the opposite edges thereof continue to be heated to the desired extent by the current flowing thereon and as conducted thereto from the edges of the gap of the ring member 24.

As shown in FIG. 4, the gap in the workpiece has become entirely closed and the welded seam thereon now extends throughout the length of the workpiece. (It should be here noted that the ring member 24 should be of a length at least equal to or preferably longer than the distance between the contacts and the weld point.) With the parts as here shown, the trailing ring member 24 has just passed the seam guide 29, so that the edges of its gap have snapped shut, thereby shortcircuiting the current path between the electrodes 31, 32. Thus the heating of the gap edges will be abruptly discontinued and there will be no tendency of the gap in the ring member 24 to become welded shut. After the assembly has passed from between the pressure rolls, the ring members 22, 24 may be pulled away from the ends of the workpiece 20 and reused.

It may be here noted that, as the current path shifts from the conditions shown in FIG. 2, to those shown in FIG. 3 or FIG. 4, the resistance of the path portions between the contacts 31 and 32 and along the gap edges, will be varied, due to the difference in conductivity in the usual case of the metal of the workpiece and the metal of which the ring-like members are made. In order that such variations of resistance need not cause any undesirable variation of the degree of heating of the gap edges at the advancing and trailing ends of the workpiece, it is desirable that the circuit supplying the high frequency current to the contacts be so designed that as much as reasonably possible of its total impedance (for example about 80% or more) will be constituted of reactance components, as distinguished from components having any very large ohmic resistance. The current flowing in the circuit is equal to the voltage across the source divided by the total impedance, and accordingly, if the circuit is designed as here suggested, such variations as occur in the ohmic resistance of the current paths along the gap edges, will have only a small or relatively negligible effect upon the total current and the resulting desired heating of the edges of the workpiece. Similar principles may be used in the design of the carrier means for the workpieces and the circuits of the other embodiments of the invention hereinafter described.

If desired, the ring-like members 22 and 24 may be so formed and with such dimensions that, in use, the gaps therein will not entirely close, but will remain slightly open and hence free of any chance of becoming welded together, and in that event, the forward member 24 may have its opposite edges bridged as same advance, to complete the necessary circuit as by roller means such as indicated for example at 82 in FIGS. 10 and 11 hereinafter described.

While, in connection with FIGS. 1–4, an embodiment of the invention in a relatively simple form has been described, as adapted for welding individual tubular elements of short or finite length, another embodiment will now be described in connection with FIGS. 5–9, wherein generally the same principles, among others, are employed for welding a continuous succession of spaced-apart workpieces. Here a flexible sheet metal belt 40 is provided, which may be of an endless type and which approaches the welding equipment as shown at the left hand end of FIG. 5, in a flat condition, the edges being guided by suitable rollers as at 41. This belt may be formed of resilient phosphor bronze sheet material or of some other good conductive metal, preferably non-magnetic, such as copper or stainless steel. Suitable means in advance of this point are provided for placing upon this belt workpieces as at 42 which may take the form of flat sheet metal rectangular elements which are intended to be curved into cylindrical form and a longitudinal welded seam formed thereon. These elements may be held initially in contact with the belt as by suitable upper and lower pressure rollers as at 43, one pair of which are best indicated in FIG. 6.

As the belt progresses through the apparatus, roller means are provided for curling same into a generally cylindrical form, as indicated at 44 at the mid-portion of the apparatus, but with a gap still remaining between the edges thereof. Thereafter the belt is so guided that it is allowed to flatten out again as indicated at 45 before it is progressed over suitable rollers (not shown) for its return to the intake end of the equipment.

As best shown in FIG. 7, as the carrier belt means 40 with the workpieces as at 42 thereon advances, same are engaged under pressure on the upper side as by a barrel-shaped roller means 46 and on the under side by roller means as at 47 of complementary shape, whereby the belt and the workpiece elements become arcuately shaped as viewed in the cross-section of FIG. 7. One or more sets of similar cooperating rollers as at 46' may be located in advance of the rollers 46, 47 and, if necessary, at points subsequent thereto as well. In between such sets of rollers, small pressure rollers as at 49 may be provided for engaging the upper and lower surfaces of the workpieces and belt. As the belt with the workpiece elements thereon is advanced further toward the right by any suitable means, the exterior of the belt which now is assuming a nearly circular cross-section, may be engaged by opposed pressure rollers as at 50, 51, which, in conjunction with one or more pairs of similar rollers as at 52, 53, serve to bring the belt with the workpieces therein, into an almost complete cylindrical formation, this action being aided by such further rollers, as at 54, as may be necessary. (If desired the workpieces may be applied to the carrier means after being cylindrically or arcuately shaped, as is done with the embodiment of FIG. 10 hereinafter described.)

It will be noted, however, that as the opposite edges of the belt approach each other with a gap therebetween, the opposite edges of the workpiece elements also will approach each other, but even more closely, so that marginal portions of the workpieces as at 55 will protrude toward each other beyond the opposed edges of the belt, whereby such marginal portions, as they eventually approach each other even more closely, will finally come together at the desired weld point w, as best shown in FIG. 8, while the edges of the belt, as at 56, 57, still remain spaced apart. If desired, the edges of the workpieces, instead of being brought together in abutting relation, as indicated in FIG. 8, may be brought together in overlapping relation in a manner generally similar to that indicated in FIG. 16 hereinafter referred to, so as to form a so-called mashed lapped weld. In either event, squeeze rollers, as at 58, 59 respectively may be mounted above and below to engage the workpiece substantially at the weld point along the line of the desired seam for suitably guiding the edges and holding same in position under pressure. The lower roller 58 may be supported by suitable bracket bearing means 60, for example mounted upon a rod 61, extending back to a suitable supporting bracket 62 (see FIG. 5) which extends up through the gap between the approaching edges of the workpiece.

After the belt passes the region of the weld point, suitable cooperating guiding or pressure rollers as at 61, 62 may be provided, which allow the belt now to tend to flatten out.

At some point subsequent to the weld point, some suitable bridging means such as roller 63 is provided for interconnecting the two edges of the belt. Shortly in advance of the weld point, suitable means are provided for supplying high frequency current to the opposed edges of the belt and of the workpieces at the gaps thereof. In the example shown in FIG. 5, an induction heating coil 64 is provided for this purpose, connected to a suitable source of high frequency current 65, for example a current of a frequency of 10,000 cycles per second or higher. Alternatively, instead of encircling this region by an induction heating coil, the high frequency current may be applied by an internally positioned induction heating coil, as shown in FIGS. 10–15, hereinafter described, or if preferred, contacts may be provided similar to those of FIGS. 2–4 for directly conducting the current of higher frequency to the edges here referred to.

The coil 64 will cause a high frequency current to be induced in a direction of flow circumferentially around on the belt at the region of its throat-like portion, shown at the mid-portion of FIG. 5, this current as it approaches the opposed edges of the belt being caused to flow along same to and from the bridging means 63, provided that no workpiece is in position with its edges in contact at the welding region and until such time as there is a workpiece in position with its edges in contact at the weld point. However, even before the advancing edges of each weld piece come into contact at the weld point, the current flowing along on the edges of the belt will, because of mutual inductance effect at the locations where the workpiece edges are positioned, tend strongly to flow along the approaching edges of such workpieces, which will then have a gap therebetween which is not yet closed by contact of the edges and yet the circuit for the high frequency current will be closed by the bridging means such as at 63. Thus the edges of the workpiece, even before they come into contact with a V-shaped gap therebetween, will begin to be heated to the requisite degree, and as they do come into contact, the contacting points will be heated to welding temperature and the succeeding points thereon will continue to be heated to welding temperature until the trailing ends of the edges of the workpiece reach the weld point, at which time the desired seam will be completely welded from the forward end to the trailing end of the workpiece. It may be noted that, as the edges at the trailing end of the workpiece approach the weld point, the induced high frequency current will continue to flow thereon in normal manner because the edges of the belt subsequent to the trailing end of the workpiece will be in a position to conduct such current into the trailing ends of the workpiece edges until the weld point has been passed.

As shown at the right hand portions of FIG. 5, the workpieces 42 will now be in cylindrical form, released from being embraced by the belt, and each will have a completely welded seam as at 66.

It may be noted that, if desired, in lieu of the roller bridge as at 63 for interconnecting and completing the circuit from one edge of the belt to the other, suitable roller means may be provided at or closer to the weld point for interconnecting the edges of the belt and/or the edges of the workpiece and for squeezing the latter together if they are to have a mash-lapped welded seam such as of FIG. 16 hereinafter described.

With the embodiment of the invention shown in FIGS. 10 to 12, the workpieces are shown in the form of nearly completed cylindrical elements as at 70, each initially having a gap as at 71 (FIG. 11). Here, instead of a belt as the carrier means, each workpiece unit is suitably inserted within a cylindrical carrier member as at 72, which has a wider longitudinal gap therein as indicated at 73 (FIG. 11). The carrier members 72 may be advanced by or on suitable chain-like conveying means, as indicated at 74 having lugs as at 75, 76 for engaging the forward and trailing ends of each carrier member to retain same in place as they are advanced with the workpieces 70 respectively resiliently embraced within each of same.

At the region of the weld point and, if desired, at one or more stations in advance of the weld point, as shown in FIGS. 10 to 12, an annular or ring-like group of pressure rollers as at 77 is provided for embracing and applying pressure to the carrier elements 72, sufficient so that the workpieces as embraced therein, when each point thereon reaches the weld point w, will come into contact. In other words, as shown in FIG. 11, as the forward ends of the opposed edges at the gap 71 in the workpiece come into contact at the weld point, there will be a V-shaped gap in the workpiece and as the workpiece with its carrier continues to be advanced toward the right, succeeding points on the opposed edges of its V-shaped gap will come into contact and all of such points in advance of the weld point will have become gradually heated to a temperature such that when each point arrives at the weld point, it will be at welding temperature. This will be the case from the very forward ends to the trailing ends of the edges. As here shown, the high frequency current is applied by the use of an internally arranged single-turn induction heating coil 78, the fluid cooled leads for which extend rearwardly as at 79 and thence upwardly as at 80 through the gaps in the carrier members and the workpieces, and thence to a source of high frequency current as at 81.

It will be apparent that, as with the cases of the previous embodiments above discussed, current will be appropriately applied to the edges of the workpieces, both before the advancing ends thereof come to the weld point and subsequent to the passage of the trailing ends thereof past the heating source by reason of the possibility of completing the high frequency circuit along on the opposing edges of the carrier means at locations where such edges are not located along adjacent the more closely spaced edges of the workpieces. To complete the circuit between the opposed edges of the carrier means in advance of the weld point, a suitable bridging means, such as a roller 82, may be provided. It will be understood that whenever at any point within the gap in the carrier means there are positioned opposed edges of the gap in a workpiece, then, because of mutual inductance effects, the current will be concentrated on the edges of the more closely spaced workpiece, yet at points where there are no opposed edges of a workpiece, the more widely spaced edges of the carrier means (together with the bridging member 82) will serve to complete the circuit for the current flowing circumferentially around on the carrier means.

As further indicated in FIGS. 10 to 12, suitable squeeze rollers as at 85, 86 may be provided respectively above and below to engage the metal substantially at the weld point for retaining and holding same in place and for flattening the seam line in case a mashed lapped seam is desired. To form a lapped seam, the dimensions of the carrier elements and the spacing of the pressure rollers guiding same, would, of course, be so designed that the edges of the workpiece will come together in the desired marginal lapped relation.

The lower squeeze roll 85 may be supported on suitable bracket means as at 89 extending rearwardly and up through the gaps of the carrier means as indicated at 90. As in all of the other embodiments, it will be understood that the high frequency current may be applied with the arrangements of FIGS. 10 to 12, alternatively by external induction coil means or by contacts for conductively applying the current directly.

FIGS. 13–16 inclusive schematically illustrate an arrangement somewhat similar to that of FIGS. 10–12, except that here the workpieces, as at 91, of finite length, are positioned to surround and embrace suitable generally tubular carrier means as at 92, having a longitudinal gap as at 93. Parts in FIGS. 13–16 which are generally similar to corresponding parts of FIGS. 10–12, are identified by the same reference characters, but accompanied by prime marks.

In FIGS. 13 to 16, it will be noted that the dimensions and parts are so designed that the workpieces will resiliently embrace the carrier means in such manner that the edges as at 95, 96 of the workpieces are more closely spaced at all points, than the edges 93 of the carrier means.

In FIGS. 13 to 15, the high frequency current will be induced to flow in directions circumferentially around the carrier means, except at the regions of the gap, and at that region the current will tend to be concentrated to flow along a path such as indicated by the dotted line at 97 (through the bridge means 82') when the parts are in a position such as shown in that figure. With the parts as shown in FIG. 14, however, the forward end edges of the gap in the workpiece will have come into contact, thereby closing the circuit for the current path across such point of contact. And with the parts as shown in FIG. 15, where the trailing end of the welded seam is just being completed, the current will be concentrated along a path indicated by the dotted line 98, that is, partially along the opposed edges 93 of the carrier means and thence across the weld point w on the workpiece. This assures that the appropriate current will flow to heat the edges of the workpiece properly up to the very trailing end of the seam.

As shown in FIG. 16, the parts have been designed with such dimensions that the edges of the workpiece will come together with a marginal overlap, so that the squeeze rolls 85', 86' will then, substantially at the weld point, cause the edges to be squeezed, for example, to a thickness equal to a single thickness of the sheet metal then being welded and with the line of the weld, in cross-section, extending diagonally as there indicated by a dotted line.

The carrier means in FIGS. 13 to 16 may be advanced in the direction indicated by the arrows, either by suitable roller means in advance of, or following, the apparatus, as shown, or by driving the rollers 77', for example.

It will be noted that with the methods and arrangements shown in FIGS. 13–15, as in the case of FIGS. 2–4, the resiliency of the workpieces is such as normally to tend to cause closing of the longitudinal gaps therein, but the holding or carrying means therefor (viz., member 92 in FIG. 13, and the members 22 and 24 in FIG. 2) serve to retain such gaps open until forcefully closed at the weld point. Similarly, but with substantially a reversal-of-parts arrangement in the embodiments of FIGS. 5 and 10, the resiliency of the workpieces is such as would normally tend to cause the gaps to expand and open more widely, but the workpieces are restrained by the carrier means against such action, viz., by the metal belt means 40 in FIG. 5, and the carrier members 72 in FIG. 10. Such reversal of parts, as compared with FIGS. 5 and 10, results from the fact that in the latter figures the workpieces are carried inside the carriers, whereas in FIGS. 2 and 13 the workpieces embrace the retaining or carrier means.

It may be further noted that the arrangement and method of FIG. 13 is quite similar to that of FIGS. 2–4 as to the broader aspects, except that in FIG. 13 the retaining or carrier means extends entirely through the workpiece, instead of having separate forward and trailing end portions as in FIGS. 2–4.

With the embodiment shown in FIGS. 17–18, workpieces as at 100 of generally cylindrical form and having a longitudinal gap as at 101, are positioned to encircle a stationary internal insulation frame structure as at 102, on which are carried a pair of elongted caontact members as at 103, 104, in such position that these contacts respectively extend along in engagement with the undersides of opposed edge portions at the gap 101 and throughout the welding region. The forward ends of the contacts 103 and 104 may be electrically connected together as by a bridging piece 105, so that normally when there is no workpiece in the apparatus, a circuit will be formed extending from a source of high frequency current 106 (such as used for the arrangements of FIGS. 2–4) through fluid-cooled lead connections as at 107, 108 to the contacts 103, 104 respectively and to the piece 105.

An annularly arranged group of rollers as at 110 is positioned to surround a portion of the insulation frame structure 102 and for engaging the workpiece 100 at various points around its periphery as same is slid into the position shown in FIG. 17, such rollers serving to advance the workpiece so that same is engaged and further advanced by a pair of opposed pressure rollers as at 111, 112, which engage the workpiece with sufficient pressure to cause the gap therein to be closed at the weld point w.

A pair of insulation spring-pressed pressure pads as at 113, 114 is provided to engage the workpiece along at either side of the gap 110 and these hold the workpiece in position against the contacts 103, 104 as the workpiece is advanced. These, as well as the contacts 103, 104, should be formed with fluid-cooling conduits.

It will be apparent that when one of the workpieces advances to a position such that the gap edges thereon come into contact at weld point w, then the current will flow along a path constituting a portion of contact 103, thence along one of the edges of the gap in the workpiece to the weld point, back along the other gap edge of the workpiece, and then along for some distance on the other elongated contact back to the current source. Thus, by the use of the bridging connection 105 in advance of the forward end of the workpiece and by the use of the elongated contacts extending back of the trailing end edges of the workpiece, the requisite continuity of the current path is maintained to weld the seam throughout from beginning to end. It will be understood that when one of the workpieces is being advanced and is positioned as shown in FIG. 17, its edges at the opposite sides of the gap are arranged to be spaced more closely than are the contacts 103, 104, and hence by reason of mutual inductance between the currents on such edges, the current will be concentrated on these edges so far as they extend.

The insulating frame structure 102 may be supported on suitable bracket means as at 115 and in such manner as not to interfere with slidable insertion of successions of the workpieces into positions for welding.

Although various particular embodiments of the invention are herein disclosed for purposes of explanation, further modifications thereof, after study of this specification, may be apparent to those skilled in the art to which the invention pertains. Reference should accordingly be had to the appended claims in determining the scope of the invention.

What is claimed and desired to be secured by Letters Patent is:

1. In a method for welding a longitudinal seam between the edges of a pair of metal portions of finite length while advancing such portions with a gap between such edges, retaining said edges under pressure together as the weld point and whereby said gap is caused to assume a V shape in advance of said point and said edges being heated up to welding temperature upon reaching such point by high frequency current caused to flow thereon for a substantial distance in advance of said point; the combination of steps for causing the seam to be welded substantially throughout from the forward ends of said edges to the trailing ends thereof, comprising the provision of carrier means for said metal portions and extending both forwardly and rearwardly thereof, such carrier means having a longitudinal gap with edges more widely spaced than the edges of said first-mentioned gap, the carrier gap edges serving to provide conductive paths for leading said current onto the edges of the forward ends of said metal portions before the latter come together at the weld point, and to contiue to lead the current onto the trailing end edges of the metal portions until same engage each other at the weld point.

2. Method for welding a seam extending along opposed edges of a longitudinal gap in a workpiece of metal tubing of finite length, which comprises: rapidly advancing said piece with said edges passing along the line of the desired seam and past a weld point; retaining said edges under pressure together at the region of said point and whereby said gap assumes a V shape in advance of said point; maintaining on said edges over a distance substantially in advance of said point flows of high frequency current for progressively heating said edges to welding temperature upon reaching said point; providing guiding means with a portion at least of generally tubular form and having a gap in advance of the gap in the workpiece, said means forming conductive paths along its gap edges for said current prior to the arrival into engagement at the weld point of the forward ends of the edges of the workpiece, thereby causing said edges to become heated to welding temperature for initiating the welded seam at the forward end of the workpiece; and providing an additional guide portion of generally tubular form and also having a gap at the trailing end of the workpiece gap, said latter portion being formed of conductive material and constructed and arranged whereby the gap therein does not become welded by such current but its gap edges serving to continue circuit paths for maintaining the heating current on the workpiece gap edges as they pass the heating region and until the trailing ends thereof reach and are brought together at the weld point whereby such welded seam extends to the trailing end of the workpiece of finite length.

3. Method for welding a seam extending along opposed edges of a pair of elongated metal portions of finite length, which comprises: rapidly advancing said portions with their said edges passing along the line of the desired seam and past a weld point and with the edges forming a V-shaped gap therebetween in advance of said point; retaining said edges together under pressure at the region of said point; maintaining on said edges over a distance substantially in advance of said point flows of high frequency current for progressively heating said edges to welding temperature upon reaching said point; providing guiding means extending in advance respectively of the forward ends of said edges and interconnected for forming a conductive path for said current to interconnect said edges prior to their arrival into engagement at the weld point, such means being formed of conductive material constructed and arranged whereby same do not become welded together by said current but serve to complete a circuit therefor prior to the arrival and engagement of the forward ends of said edges at the weld point thereby causing said edges to become heated to welding temperature for initiating the welded seam at said forward ends of the finite length elements; and providing guiding means at the trailing ends of said edges respectively also formed of conductive material constructed and arranged whereby same do not become welded together by such current but which serve to continue the circuit for maintaining the heating current on said edges until the trailing ends thereof reach and are brought together at the weld point whereby such welded seam extends to said trailing ends of the finite length elements.

4. Method for forming sheet metal tubular elements of finite length having longitudinally-extending welded seams, which comprises: longitudinally advancing a sheet metal belt while gradually bending same transversely from an initially spread out condition to a condition in which the longitudinal edges thereof are curled around toward each other to provide the belt with a generally tubular formation with a gap between said edges as same pass a welding region, the belt thereafter being restored to its spread out condition; applying to the belt to be carried thereby a series of spaced-apart areas of sheet metal which are to form respectively the tubular elements; retaining said areas against the belt as the latter is bent transversely as aforesaid, whereby said areas become embraced by the belt and bent into tubular form as same pass through said region, said areas being of such dimensions that a gap is formed between the side edges thereof at such region, such gap being narrower than the gap in the belt, the belt and the metal elements of tubular form as embraced therein at said region being subjected to pressure from opposite sides thereof to bring the edges of the gaps in said elements together as they pass a weld point; and causing high frequency current to flow along on the edges of the gap in the belt at said region, the current at any moment on one such edge being of a polarity opposite to that on the other such edge and whereby when one of said elements is at said region, such current will flow along and be concentrated on the opposed edges of the gap in the element for heating each point thereon to welding temperature upon reaching the weld point, the edges of the gap in the belt serving to provide paths for said current for heating the forward end portions of the edges of the element prior to their arrival and coming into contact at the weld point and also paths for continuing the heating current on the trailing end portions of said edges of the element until same come into engagement at the weld point, and whereby the seam on each element will become welded substantially throughout from the forward end to the trailing end thereof.

5. Apparatus for forming sheet metal tubular elements of finite length having longitudinally-extending welded seams, which comprises: a longitudinally advancing sheet metal belt; means for gradually bending the advancing belt transversely from an initially spread out condition to a condition in which the longitudinal edges thereof are curled around toward each other to provide the belt with a generally tubular throat formation with a gap between said edges as same pass a welding region; means for retaining on the belt to be carried thereby a series of spaced-apart areas of sheet metal which are to form respectively the tubular elements, said areas being retained against the belt as the latter is bent transversely as aforesaid and with the side edges of the elements protruding beyond the belt edges, whereby such areas become embraced by the belt and bent into tubular form as same pass through said region, and a gap is formed between said side edges which is narrower than the gap in the belt; means for subjecting the belt and the metal elements of tubular form as embraced therein at said region to pressure from opposite sides thereof to bring the edges of the gaps in said elements together as they pass a weld point; and means for causing high frequency current to flow along on the edges of the gap in the belt at said region, with the current at any moment on one such edge of a polarity opposite to that on the other and also whereby when one of said elements is at said region, such currents will flow along and be concentrated on the opposed edges of the gap in the element for heating each point thereon to welding temperature upon reaching the weld point, the edges of the gap in the belt serving to provide paths for said current for heating the forward end portions of the edges of the element prior to their arrival and coming into contact at the weld point and also paths for continuing the heating current on the trailing end portions of said edges of the element until same come into engagement at the weld point, and whereby the seam on each element will become welded substantially throughout from the forward end to the trailing end thereof.

6. Method for forming sheet metal tubular elements of finite length with longitudinally-extending welded seams, which comprises: placing a succession of areas of sheet metal which are to form said elements along on a belt of conductive material with the side edges of said areas extending beyond the side edges of the belt; continuously advancing the belt with said area thereon, while curving the belt transversely to bring its side edges into opposed spaced relation with a gap therebetween while said areas of sheet metal are embraced thereby and curved into tubular shape with the side edges thereof being brought into opposed relation and pressed together at a weld point in a narrow V-formation; and maintaining on said opposed edges of the belt and of said areas over a distance substantially in advance of said weld point, flows of high frequency current concentrated on the closest portions of said edges for progressively heating the edges of said areas to welding temperature at each point thereon as it reaches the weld point, the opposed edges of the belt serving to provide paths for said current for heating the forward end portions of the edges of the areas prior to ther arrival and coming into contact at the weld point, and also paths for continuing the heating current on the trailing end portions of said edges of the areas until same come into engagement at the weld point and whereby the seam on each element will become welded substantially throughout from the forward end to the trailing end thereof.

7. Apparatus for welding longitudinally-extending seams on metallic tubular elements of finite lengths and initially having longitudinal gaps therein, which comprises in combination: generally tubular conveying and holding means for carrying said elements in spaced relation and in succession, said means being formed with opposed edges providing a longitudinal gap therebetween and wider than the gaps of said elements; means for longitudinally advancing said conveying and holding means together with said elements, and for subjecting same to pressure at opposite sides at the region of a weld point, whereby the edges of the gaps in the elements are brought together under pressure at the weld point; and means for causing high frequency current to flow in advance of the weld point along on the gap edges of the conveying means with the current at any moment on one such edge of a polarity opposite to that on the other, and also whereby when one of said elements is at the welding region, such current will flow along and be concentrated on the opposed edges of the element for heating each point thereon to welding temperature upon reaching the weld point, the gap edges of the conveying means serving to provide paths for said current for heating the forward end portions of the edges of the element prior to their arrival and coming into contact at the weld point and also paths for continuing the heating current on the trailing end portions of the edges of the element until same come into engagement at the weld point, and whereby the seam on each element will become welded substantially throughout from the forward end to the trailing end thereof.

8. Apparatus in accordance with the foregoing claim 7 and in which the means for applying pressure at opposite sides at the region of the weld point comprises: a generally annular cluster arrangement of rollers through which the conveying means together with the elements in advanced.

9. Apparatus in accordance with the foregoing claim 7 and in which the conveying and holding means comprises: a succession of generally tubular members each for containing and embracing one of the tubular elements to be welded and extending both forwardly and rearwardly of the ends of the element; and conveying means for conveying said members in succession past the welding region.

10. Apparatus in accordance with the foregoing claim 7 and in which said conveying and holding means comprises: an elongated tubular member and having the elements which are to be welded positioned in spaced-apart relation thereon and embracing same.

11. Apparatus in accordance with the foregoing claim 7 and in which the carrier means is so shaped as to bring the edges of the gaps in the elements into overlapping relation at the weld point, and pressure rollers being provided above and below the weld point for causing a mashed-lapped weld to be there formed.

References Cited in the file of this patent
UNITED STATES PATENTS

| | | |
|---|---|---|
| 1,986,370 | Sessions | Jan. 1, 1935 |
| 2,794,108 | Park | May 28, 1957 |
| 2,919,342 | Kohler et al. | Dec. 29, 1959 |
| 2,922,019 | Rudd | Jan. 19, 1960 |

FOREIGN PATENTS

| | | |
|---|---|---|
| 472,634 | Canada | Apr. 3, 1951 |

UNITED STATES PATENT OFFICE
CERTIFICATE OF CORRECTION

Patent No. 3,131,285 April 28, 1964

Fred Kohler et al.

It is hereby certified that error appears in the above numbered patent requiring correction and that the said Letters Patent should read as corrected below.

Column 10, line 25, for "as" read -- at --; column 12, line 55, for "ther" read -- their --; column 13, line 21, for "in" read -- is --.

Signed and sealed this 8th day of September 1964.

(SEAL)
Attest:

ERNEST W. SWIDER
Attesting Officer

EDWARD J. BRENNER
Commissioner of Patents